United States Patent [19]
Dodge

[11] Patent Number: 5,660,637
[45] Date of Patent: Aug. 26, 1997

[54] PAINT RACK FOR A VEHICLE BODY SHOP

[76] Inventor: John P. Dodge, 1507 Brixham Ave., McHenry, Ill. 60050

[21] Appl. No.: 554,988

[22] Filed: Nov. 13, 1995

[51] Int. Cl.$^6$ .......................... B05C 13/00; B62D 21/14
[52] U.S. Cl. .......................... 118/500; 280/35; 280/79.3; 280/79.11
[58] Field of Search .................. 118/500; 280/79.3, 280/35, 79.11; 211/175, 189, 13, 208, 207, 206, 204, 182, 190; 296/3; 248/129, 161, 407–409, 159, 157, 419, 180

[56] References Cited

U.S. PATENT DOCUMENTS

| | | |
|---|---|---|
| 2,533,324 | 12/1950 | Mendle . |
| 3,318,462 | 5/1967 | Spiegl et al. . |
| 3,503,525 | 3/1970 | Loebner . |
| 3,762,951 | 10/1973 | Hetznecker . |
| 3,792,917 | 2/1974 | Martinez . |
| 4,032,165 | 6/1977 | Russell . |
| 4,715,502 | 12/1987 | Salmon . |
| 4,934,015 | 6/1990 | Mink . |
| 5,090,725 | 2/1992 | Feldner . |
| 5,296,030 | 3/1994 | Young .......................... 118/500 |

Primary Examiner—Donald E. Czaja
Assistant Examiner—Calvin Padgett
Attorney, Agent, or Firm—Mathew R. P. Perrone, Jr.

[57] ABSTRACT

A paint rack for use in a vehicle body shop includes a frame mounted on wheels, which are repositionable wheels for use or storage as desired. The frame may be fixed or adjustable, both vertically and horizontally.

19 Claims, 4 Drawing Sheets

PAINT RACK FOR A VEHICLE BODY SHOP

This invention relates to a paint rack especially for use in a vehicle body shop and more particularly to a paint rack, which is adjustable horizontally and vertically, and that can be used and stored efficiently.

BACKGROUND OF THE INVENTION

In a vehicle body shop where repairs are accomplished to the body of a vehicle, one of the major difficulties is painting various pieces of a vehicle. For example, it is sometimes difficult to paint a door or other piece of a vehicle. Typically, an arithmetic increase in the number of steps for the painting process of a vehicle geometrically increases the painting problems.

For example, the painting of a vehicle door can be a problem. Typically, it is required to place the door in the painting chamber, paint one side of the door, dry the paint, remove the door from the painting chamber, allow the paint to cure for up to twenty-four hours or more, turn the door over, and then repeat all of those steps to paint the other side of the door. This multi-step procedure is expensive in terms of time and manpower.

It is also a difficult and clumsy handling procedure. Most of these steps require handling of the door to achieve the desired results. During handling, damage can be done to the paint job, which in turn requires correction. Storage of the part, while the paint is curing, is also a problem. So these multi-step handling procedures are at best undesirable, and at worst a major problem.

Also in a vehicle body shop, space is at a premium. If a rack is available to be used in the painting chamber, it can create more problems than it solves. Such a rack may take up too much space. This rack may additionally lack strength and mobility.

Also, the various parts to be painted require different size racks. It is sometimes more efficient to hang a device on a smaller rack than a larger rack. Also, a larger rack is not suitable for a smaller piece of material. It is much easier to hang a fender on a small rack than it is to hang a door of a vehicle on a small rack. Thus, the complications of the rack can add to the problems rather than solve the problems of painting the door or any other piece of a vehicle appropriately.

The other problem, of course, is space. If a rack is big enough and strong enough to support an item to be painted, it also takes up space. Space, of course, is at a premium. Thus, when the rack is not in use, there must be a way to conveniently store the rack without taking up space.

The bulkiness and weight of vehicle body parts make it difficult to make a rack suitable for use in a body shop. Racks known in the art lack the strength required and cannot be reinforced without a substantial loss in the required mobility.

The known adjustable racks also lack the desired strength. Again simply reinforcing those racks can destroy the very desirable adjustability. Clearly, substantial improvements are required to solve this problem in vehicle body repair art.

The ideas of mobility, strength, adjustability, and storability contradict each other. To maximize one of these items almost inherently weakens the other. Thus, it is very difficult to develop a rack to have the desired strength and adjustability, while maintaining the storability and mobility for those purposes.

SUMMARY OF THE INVENTION

Among the many objectives of this invention is the provision of a paint rack to support a vehicle part during a painting process.

Another objective of this invention is to provide a paint rack which reduces the painting process steps.

Yet another objective of this invention is to provide a paint rack which is easily stored.

Still another objective of this invention is to provide a paint rack which is adjustable in size.

Also, an objective of this invention is to provide a strong paint rack.

Additionally, an objective of this invention is to provide a suitable paint rack for use in a vehicle body shop.

A further objective of this invention is to provide a mobile paint rack.

A still further objective of this invention is to provide a paint rack which minimizes handling of the object being painted.

Yet a further objective of this invention is to provide a paint rack, which permits painting of an entire part in one application.

These and other objectives of the invention (which other objectives become clear by consideration of the specification, claims and drawings as a whole) are met by providing a paint rack for use in a vehicle body shop. The paint rack is a frame mounted on wheels, which are repositionable wheels for use or storage as desired. The frame may be fixed or adjustable, both vertically and horizontally.

BRIEF DESCRIPTION OF DRAWINGS

Throughout the figures of the drawings where the same part appears in more than one figure the same number is applied thereto.

DESCRIPTION OF THE PREFERRED EMBODIMENTS

Figure 1:
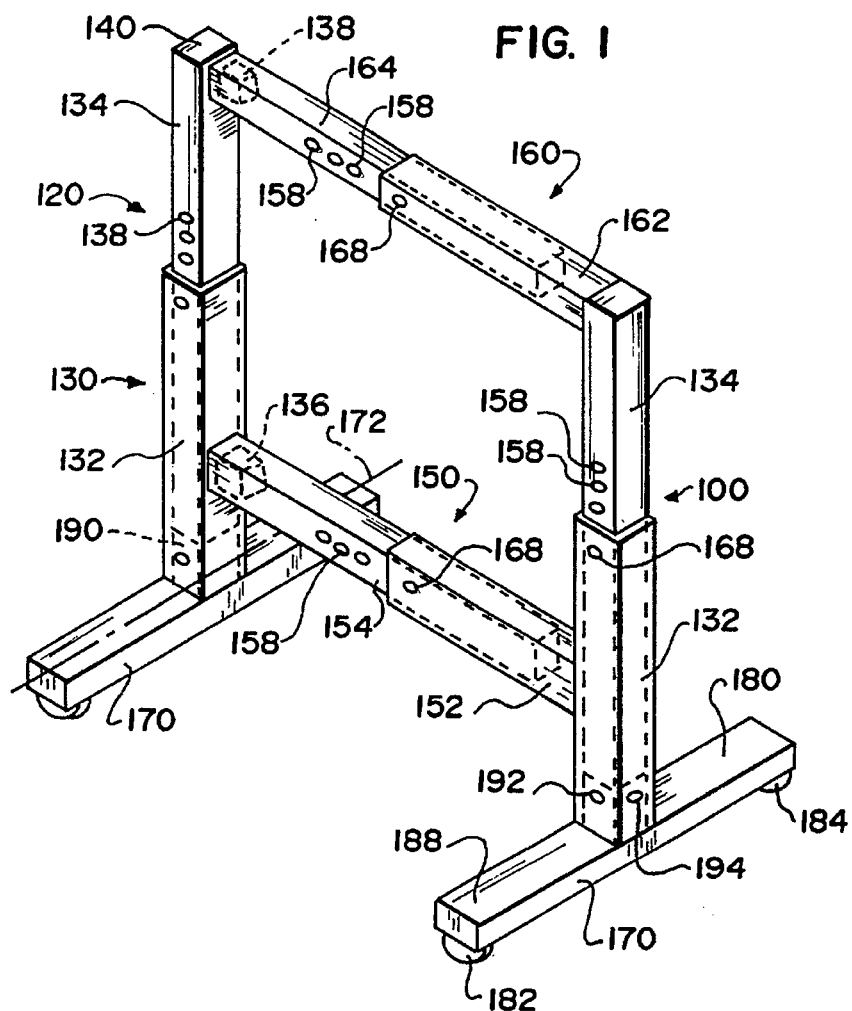
FIG. 1 depicts a perspective view of an adjustable paint rack 100 of this invention.

The paint rack includes a frame mounted on wheels. To permit the rack to be stored when not in use, the wheels are repositionable. The frame of the paint rack may be fixed. In another embodiment, the frame of the paint rack may be adjustable both vertically and horizontally. Also for storage, the adjustable rack can be adjusted to its smallest size. For use the adjustable rack can be adjusted to fit the size of the item being painted.

For storage, the axis of the wheel assembly and the wheel assembly itself of the paint rack is substantially co-planar with the frame. In use, the axis of the wheel assembly is perpendicular to the frame of the paint rack. The wheel assembly is mounted in the frame and secured therein in a standard fashion, such by a nut and bolt assembly. Two different securing positions provide for a storage position or a use position.

For the frame of the paint rack, any shape is operable. The shape may circular or ellipsoidal. A polygonal shape is preferred, however. Of the polygons, the rectangular shape is the most suitable.

For example, from this rack, a vehicle door may be hung. The rack can then be placed in a paint spraying chamber, which is usually standard equipment in an vehicle body repair shop. All sides of the door can be painted at once. Then the paint on the door can be dried and cured right in place on the rack. In this fashion, the door or any desired vehicle part can be painted in fewer steps, and have the applied paint complete the curing process without further handling.

The fixed frame is preferably formed by tubular members. On the frame is a pair of wheeled member. Each wheeled member has a wheel bar with two wheels, such as castors, secured to one side thereof. Oppositely disposed from the wheels is on the wheel bar is a mounting post.

To each mounting post is secured a side bar. From the side bar extends a middle brace bar post and a top brace bar post. The middle brace bar post is located on the side bar between the top brace bar and the mounting post. The top brace bar post is oppositely disposed from the mounting post.

Thus, the middle brace bar post and the top brace bar post are also attached to right angles with the mounting post. Both middle brace bar post and top brace bar post permit attachment of the top brace bar and the middle brace bar respectively. In this fashion, the frame may be assembled.

Preferably, the mounting post, the side bar, the middle brace bar post, and the top brace bar post, along with the top brace bar, and the middle brace bar are all tubular members. The diameters are adjusted such that the tubular members may slide within each other. While any suitable securing means may be adapted to fix the frame, the simplest and most efficient securing means is achieved by merely having apertures in the appropriate places and providing a fastening device to secure the members. A desired fastening device is a nut and bolt assembly. Also suitable is a cotter pin assembly, provided the apertures are co-linear through the tubes forming the frame.

The interior tube may have a series of co-planar apertures. By being interior, adjustability is achieved. The outer tube can compensate for the any interior tube weakness caused by the series of apertures.

It makes no difference which bar slides into the other. Each rack is equally strong. However, it is felt that for efficiency the mounting post should slide within the side bar, and the middle brace bar and the top brace bar should slide within the brace bar post.

The mounting post includes a second set of apertures so that the wheels may be rotated about 90 degrees to be parallel to the middle brace bar and reinserted. With this rotation, the rack may be more easily stored. Without this rotation or with a second rotation of 90 degrees, the rack may be used. This is accomplished simply by the apertures and bolt assemblies used therein.

The adjustability of the paint rack is accomplished by providing the top brace bar, the middle brace bar, and the two side bars include nestable members. Then with the nestable members and the appropriate bolt assemblies, the desired strength can be obtained.

The nestable members permit the bars to slide within each other and thereby decrease or increase the size of the rack as desired. It is clear from the top brace bar that an all part may be hung and in any appropriate means such as by a wire or a hook such that the vehicle part can be painted on all sides at the time of spraying.

The nestable members may be assembled in any suitable fashion. Side bars may have mounting posts for nestable members. The nestable members may be L-shaped to form the frame or rack. It is believed that the mounting posts are the most efficient way to mount the nestable members.

Two L-shaped top pieces which are nestable and fixable and two straight side pieces are nestable and fixable. Into the top Of the straight side pieces, the two L-shaped pieces fit. Into the base of the two side pieces, the two wheel pieces fit. In this fashion, the wheels can be rotated and the rack can be made smaller when it is not required to use the rack.

The fixed frame can be formed by tubular members. There may be two L-shaped top pieces which are nestable and fixable and two straight side pieces are nestable and fixable. Into the top of the straight side pieces, the two L-shaped pieces fit. Into the base of the two side pieces, the two wheel pieces fit. In this fashion, the wheels can be rotated and the rack can be made smaller when it is not required to use the rack.

In the second embodiment, a bracing bar can be placed below to strengthen the structure. In this fashion, it is quite possible to shrink the rack down to its smallest size, rotate the wheels 90 degrees and have a desired positioning of the various pieces, for storage purposes. The procedure is reversed when use is desired.

Relative to the preferred paint rack of this invention, is shown a friction assembly used to form the friction paint rack. Apertures of this friction paint rack pass only through one side of the tubes used to form this paint rack. For example, the mounting post on the wheel assembly lacks any apertures.

The first side post and the second side post of the friction rack each include a first member and a second member. The first member is tubular in nature and can receive the mounting post. Other first member adjacent to the mounting is a nut welded or otherwise secured surrounding an aperture passing through a wall of the tube.

The nut and the aperture can receive a bolt therethrough. The bolt in turn contacts the mounting post to hold the wheel assembly therein. In this fashion, other tubes forming an adjustable friction paint rack may be adjustable without having the series of apertures. The top side member has secured thereto a half of the top brace bar and a half of the middle brace bar. The other top side member has secured thereto the other half of the top brace bar and the other half of the middle brace bar. The halves of the top brace bar and the middle brace are mutually nestable.

The halves of the top brace bar and the middle brace are mutually are also mutually lockable by the aperture, nut secured therearound, and bolt therethrough to lock each interior half in position. Again with the neutral slidability involved therein, the rack thus becomes adjustable to the desired shape or size.

With only one aperture in each exterior half and bolt contact of the interior half, the adjusting positions greatly over the adjusting positions provided by the apertured adjustable rack. The aperture also provides a stronger tube with the lack of apertures.

This procedure, using any one of the described racks, provides a great advantage to the body shop in that the part once painted can just be left on the rack for curing. The part for spraying may also be removed from the spraying chamber and permitted to dry or cure in a place away from the spraying chamber thereby permitting the spraying chamber to become more efficient used.

Figure 2:
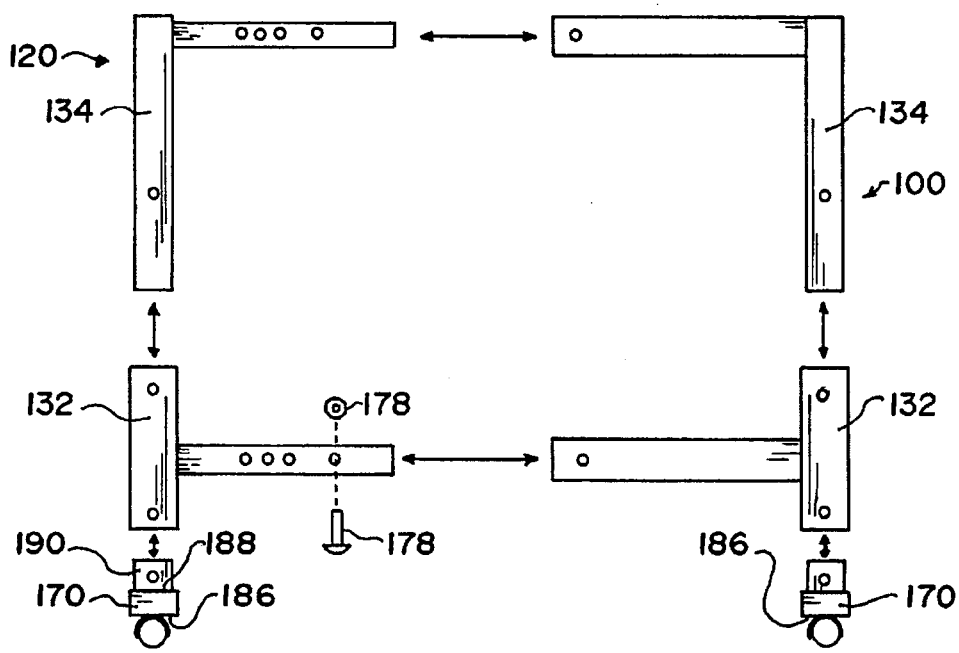
FIG. 2 depicts an exploded, side view of the adjustable paint rack 100 of this invention as shown in FIG. 1.

Referring now to FIG. 1 and FIG. 2 an exploded perspective view of the adjustable paint rack 100 includes an adjustable frame 120 mounted on a wheel assembly 170. To permit the adjustable paint rack 100 to be stored when not in use, the wheel assembly 170 is repositionable relative to adjustable frame 120. The adjustable frame 120 may be adjustable both vertically and horizontally.

Also for storage, the adjustable paint rack 100 can be adjusted to its smallest size. For use, the adjustable rack 100 can be adjusted to fit the size of the item being painted.

For storage, the axis 172 of the wheel assembly 170 is substantially co-planar with the adjustable frame 120 as storage position 174. In use, the axis 172 of the wheel assembly 170 is perpendicular to the adjustable frame 120 of the adjustable paint rack 100 for use position 176.

The wheel assembly 170 is mounted in the adjustable frame 120 and secured therein in a standard fashion, such by a nut and bolt assembly 178. Two different securing positions for the wheel assembly 170 provide for a storage position or a use position.

In wheel assembly 170, an elongated wheel bar 180 has a first wheel 182 and a second wheel 184 secured thereto on a wheel side 186 thereof. Oppositely disposed from wheel side 186 is mounting side 188. On mounting side 188 is secured a mounting post 190. Mounting post 190 receives the frame 120.

Figure 5:
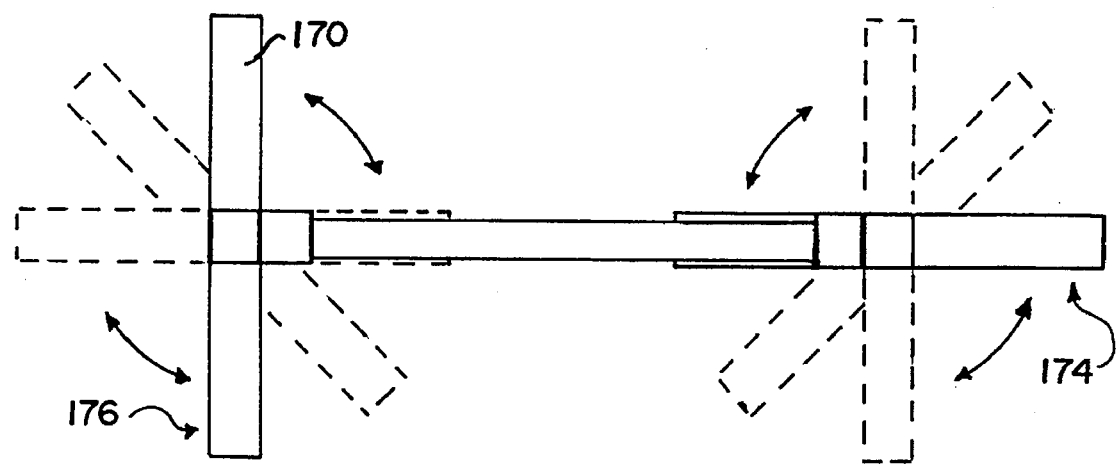
FIG. 5 depicts a bottom, plan view of the adjustable paint rack 100 of this invention having one wheel assembly 170 in use position 176 and one wheel assembly 170 in storage position 174.
Figure 6:
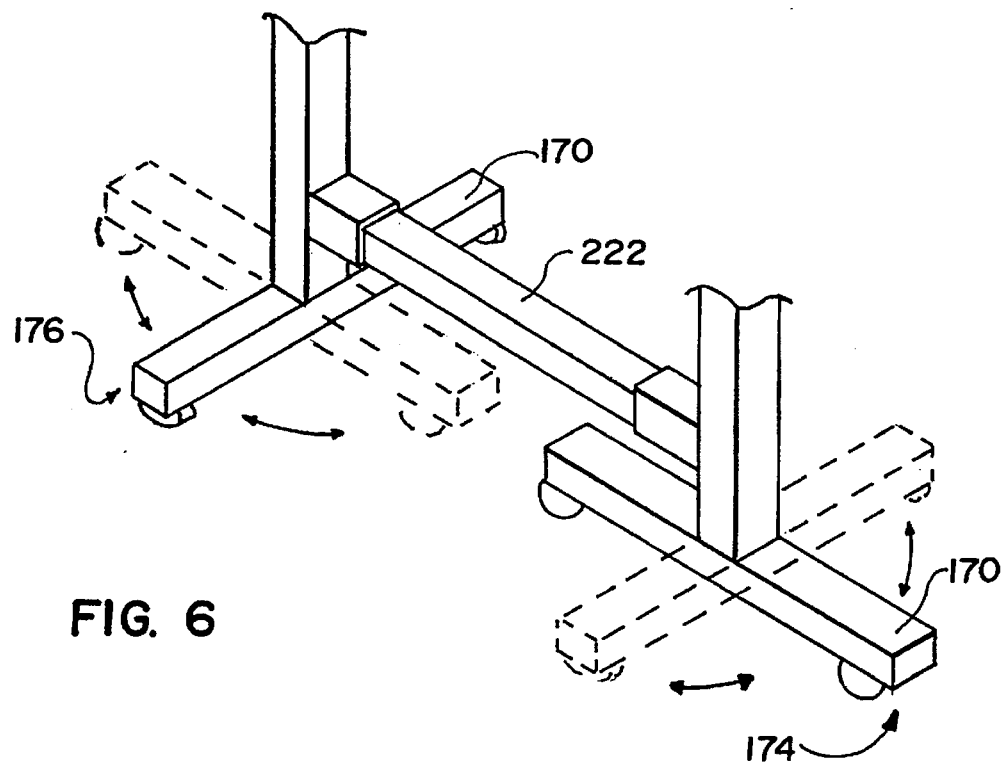
FIG. 6 depicts a perspective view of the fixed paint rack 200 of this invention having one wheel assembly 170 in use position 176 and one wheel assembly 170 in storage position 174.

The mounting post 190 includes a first set of post apertures 192 and a second set of post apertures 194. The first set of post apertures 192 and the second set of post apertures 194 are positioned so that the wheels 182 and 184 may be rotated about 90 degrees. The use position 176 and storage position 174 for wheel assembly 170 are depicted in FIG. 5 and FIG. 6. With this rotation, the adjustable rack 100 may be more easily stored.

The adjustable paint rack 100 is accomplished by providing nestable members for various parts thereof. More specifically providing each side bar 130, the middle brace bar 150, and the top brace bar 160 include nestable members. Then with the nestable members and the appropriate nut and bolt assemblies 178, the desired strength can be obtained.

Side bar 130 includes a first side member 132 and a second side member 134. The first side member 132 is connected at one end to mounting post 190 and to second side member 134 at the other end. The middle brace bar 150, and the top brace bar 160 may be attached at each opposing end thereof to each side bar 130 as desired.

In a preferred form first side member 132 includes middle brace post 136, while second side member 134 includes top brace post 138. Top brace post 138 is preferably oppositely disposed from first side member 132 and at an end 140 of second side member 134. Also preferably, middle brace post 136 and top brace post 138 are substantially and mutually parallel.

Middle brace bar 150 has a first middle joinable piece 152 and a second middle joinable piece 154. First joinable piece 152 and second middle joinable piece 154 receive opposing middle brace posts 136 at one end of each. First middle joinable piece 152 and second middle joinable piece 154 are joined together in a slidable fashion at the end oppositely disposed from middle brace post 136.

Top brace bar 160 has a first top joinable section 162 and a second top joinable section 164. First top joinable section 162 and second joinable section 164 receive opposing middle brace posts 136 at one end of each. First top joinable section 162 and second joinable section 164 are secured together in a slidable fashion at the end oppositely disposed from top brace post 138.

Second middle joinable piece 154 and second top joinable section 164 have a similarity. Second middle joinable piece 154 and second top joinable section 164 each include a series of apertures 158 through the tube thereof. Series of apertures 158 cooperate with fastening aperture 168 to provide for adjustability of middle brace bar 150 and top brace bar 160.

Second side member 134 also includes aperture series 158 to cooperate with a similar fastening aperture 168 in first side member 132. This provides four way adjustability for adjustable rack 100.

The nestable members, when permitting a slidable relationship, are preferably of a rectangular or square cross-section. This permits easier formation of desired apertures 126 for section nestable members with the nut and bolt assembly 178.

To provide for adjustability, first joinable piece 152 and first joinable section 162 include a series of apertures. These series of apertures permit the middle brace bar 150 and the top brace bar 160 to be adjusted in length as desired. In a similar fashion, second side member has also a series of apertures. In this way the cotter pin assembly or the nut and bolt assembly may be used to render the adjustable rack movable between a variety of fixed positions and sizes.

Figure 3:
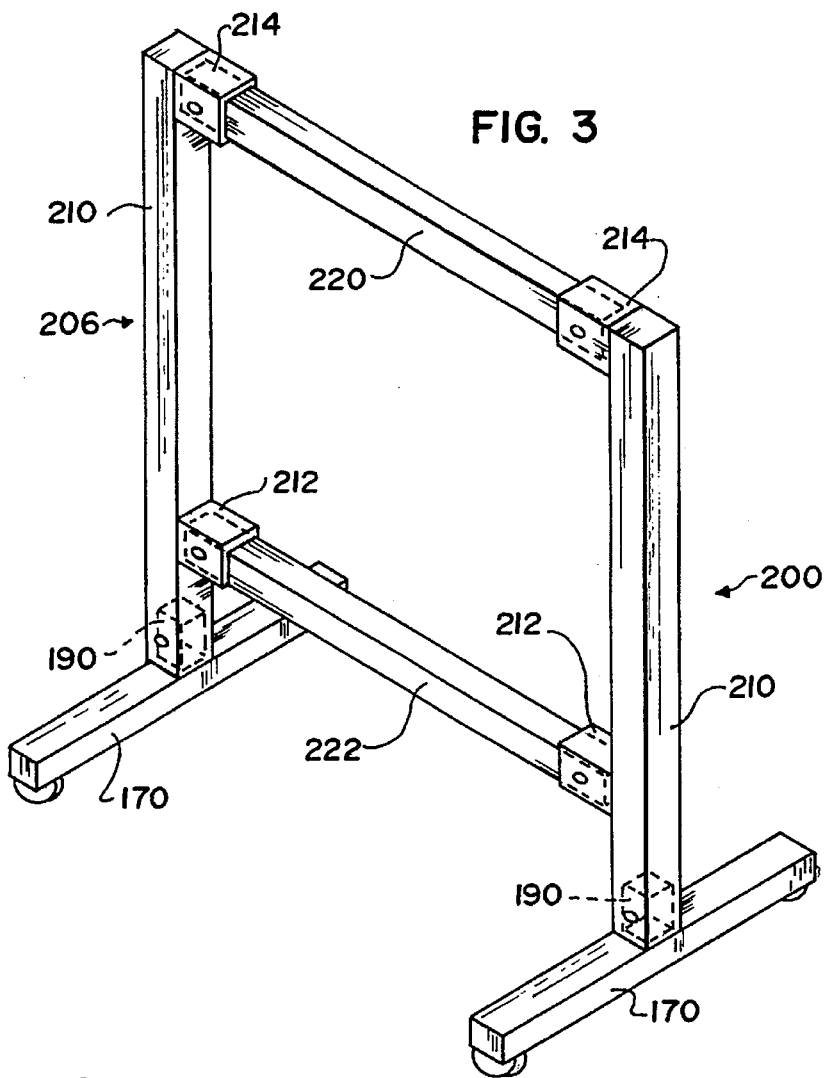
FIG. 3 depicts a perspective view of a fixed paint rack 200 of this invention.
Figure 4:
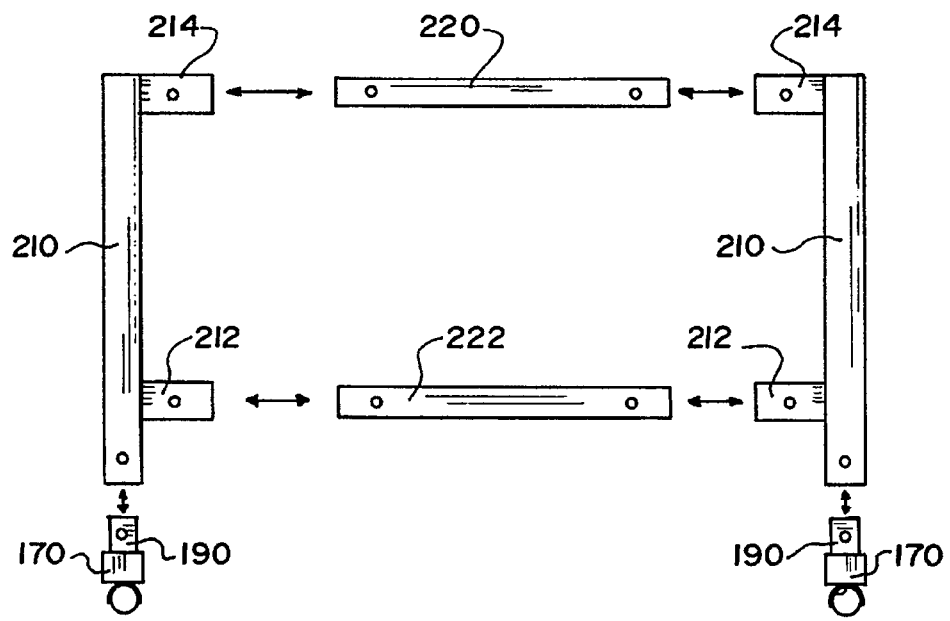
FIG. 4 depicts an exploded, side view of the fixed paint rack 200 of this invention as shown in FIG. 4.

Referring now to FIG. 3 and FIG. 4, the fixed paint rack 200 is formed by tubular members. The wheel assembly 170 also fits the fixed paint rack 200 as an attachment to fixed frame 206. Fixed frame 206 is formed in any suitable fashion.

Preferably for fixed frame 206, to each mounting post 190 is secured a side bar 210. From the fixed side bar 210 extends a middle fixed post 212 and a top fixed post 214. The middle fixed post 212 is located on the fixed side bar 210 between the top fixed post 214 and the mounting post 190. The top fixed post 214 is oppositely disposed from the mounting post 190.

Thus, the middle fixed post 212 and the top fixed post 214 are also attached at right angles with the fixed side bar 210 post. Both middle fixed post 212 and top fixed post 214 permit attachment of the top solid bar 220 and the middle fixed bar 222 respectively. In this fashion, the fixed frame 206 may be assembled.

Figure 7:
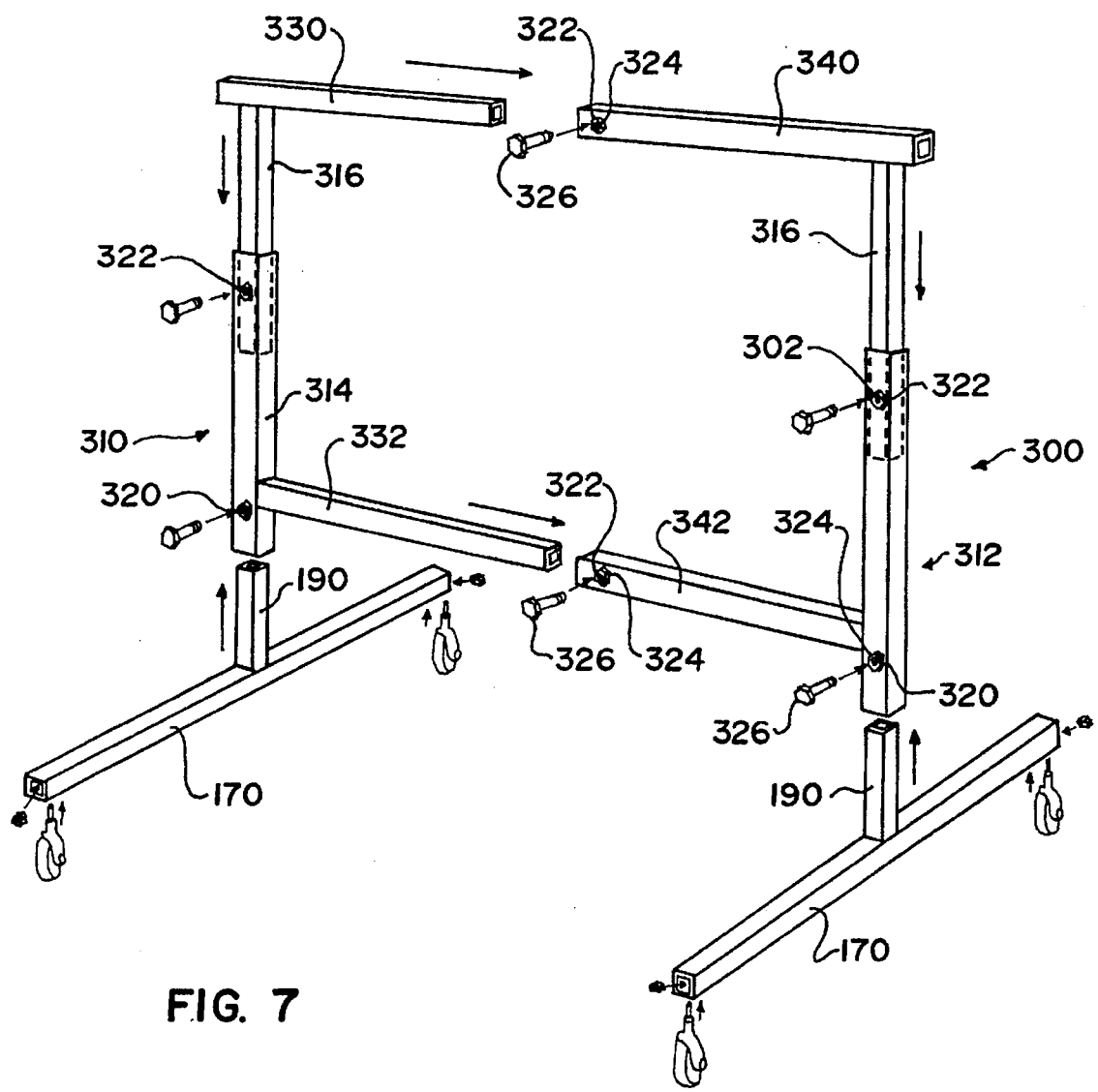
FIG. 7 depicts a perspective view of a friction paint rack 300 of this invention.

Referring now to FIG. 7, the preferred the friction paint rack 300 is depicted. Adjustability is achieved without the weakness caused by a plurality of through apertures such as first set of post apertures 192 and a second set of post apertures 194. The side apertures 302 of this friction paint rack pass 300 only through one side of the tubes used in the forming thereof. For example, the mounting post 190 on the wheel assembly 170 does not require any post apertures.

Friction paint rack 300 includes a first side post 310 and a second side post 312, which in turn, each include a first nestable member 314 and a second nestable member 316. The first nestable member 314 is tubular in nature and can receive the mounting post 190 at one end. Preferably first nestable member 314 receives second nestable member 316 at its opposing end. That nesting can be reversed.

The first nestable member 314 includes a first side aperture 320 adjacent to the mounting post 190 and second side aperture 322 to support the second nestable member 316. Around first side aperture 320 and second side aperture 322 is secured a nut 324. The nut 324 can receive a bolt 326 to contact whatever is interior to first nestable member 314 and fix the position thereof.

To reemphasize, the nut 324 and the aperture 322 can receive a bolt 326 therethrough. The bolt 326 in turn contacts the mounting post 190 in order to hold the wheel assembly 170 therein, whether in use position 176 or storage position 174 (FIG. 5 and FIG. 6). Other tubes forming an adjustable friction paint rack 300 may also be adjustable without having the series of apertures.

More specifically, one of second nestable member 316 has bolted, welded or otherwise thereto a first top brace bar half 330 and a first middle brace bar half 332. Likewise, the other of the second nestable member 316 has bolted, welded or otherwise thereto a second top brace bar half 340 and a second middle brace bar half 332.

First top brace bar half 330 fits into second top brace bar half 340. Similarly, first middle brace bar half 332 fits into second middle brace bar half 342. First top brace bar half 330 includes fits into second top brace bar half 340. Similarly, first middle brace bar half 332 includes the nut 324, the aperture 322 and bolt 326 to lock it into second middle brace bar half 342. First top brace bar half 330 also includes the nut 324, the aperture 322 and bolt 326 into second top brace bar half 340.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A paint rack for use in a vehicle body shop, the paint rack including:
   (a) a frame mounted on a wheel assembly;
   (b) a repositionable means cooperating with the wheel assembly in order to provide a use position for the wheel assembly of the paint rack and a storage position for the wheel assembly of the paint rack relative to the frame;
   (c) the frame including a support means for a part of a vehicle to be painted; and
   (d) the use position providing either for the part of the vehicle to be painted or to be supported during a paint drying procedure;
   (e) the storage position having the wheel assembly substantially co-planar with the frame;
   (f) the use position having the wheel assembly substantially perpendicular to the frame; and
   (g) the support means being adapted to receive the part of a vehicle to be painted.

2. The paint rack of claim 1 further including:
   (a) the frame having a rectangular shape;
   (b) the frame being formed of tubular members;
   (c) the storage position having the wheel assembly substantially co-planar with the frame;
   (d) the use position having the wheel assembly substantially perpendicular to the frame; and
   (e) the tubular members receiving the wheel assembly.

3. The paint rack of claim 2 further including:
   (a) the wheel assembly having an elongated wheel bar with a mounting post and at least one wheel rotatably secured thereto;
   (b) the mounting post receiving the frame;
   (c) the mounting post combining with the frame to form the use position and the storage position; and
   (d) a securing means for joining the mounting post to the frame.

4. The paint rack of claim 3 further including:
   (a) the at least one wheel including a first wheel and a second wheel;
   (b) the elongated wheel bar having a first bar end and a second bar end oppositely disposed from the first bar end;
   (c) the first wheel being mounted at the first bar end; and
   (d) the second wheel being mounted at the second bar end.

5. The paint rack of claim 4 further including:
   (a) the first wheel and the second wheel being on a first side of the wheel bar;
   (b) the mounting post being mounted on a second side of the wheel bar; and
   (c) the mounting post being oppositely disposed from the first wheel and the second wheel.

6. The paint rack of claim 5 further including:
   (a) the mounting post being centrally situated on the wheel assembly between the first wheel and the second wheel;
   (b) the mounting post including a use position fastening means and a storage position fastening means; and
   (c) the wheel assembly being changeable between the use position and the storage position on the frame for the paint rack.

7. The paint rack of claim 6 further including:
   (a) the frame including a first side bar and a second side bar;
   (b) the mounting post including a first mounting post and a second mounting post;
   (c) the first side bar being removably secured to the first mounting post;
   (d) the second side bar being removably secured to the second mounting post;
   (e) a top brace bar joining the first side bar and the second side bar; and
   (f) the top brace bar being oppositely disposed from the first mounting post and the second mounting post.

8. The paint rack of claim 7 further including:
   (a) the frame including a middle brace bar; and
   (b) the middle brace bar being situated between the top brace bar and the first mounting post.

9. The paint rack of claim 8 further including:
   (a) the middle brace bar being substantially parallel to the top brace bar;
   (b) the middle brace bar being secured at one end to the first mounting post; and
   (c) the middle brace bar being secured at an opposing end to the second mounting post.

10. The paint rack of claim 9 further including:
(a) the middle brace bar, the first side bar, the second side bar and the top brace bar being tubular members; and
(b) a series of posts receiving the tubular members.

11. The paint rack of claim 10 further including:
(a) the series of posts including a first middle brace post, a second middle brace post, a first top brace post, and a second top brace post;
(b) the first side bar including the first middle brace post and the first top brace post;
(c) the second side bar including the second middle brace post and the second top brace post;
(d) the first top brace post and the second top brace post receiving and supporting the top brace bar; and
(e) the first middle brace post and the second middle brace post receiving and supporting the middle brace bar.

12. An adjustable paint rack for use in a vehicle body shop, the paint rack including:
(a) a frame mounted on wheel assembly;
(b) the wheel assembly having a use position for the paint rack and a storage position for the paint rack relative to the frame;
(c) the frame including a support means for a part of a vehicle to be painted thereon;
(d) the frame including an adjusting means to change the size of the frame;
(e) the use position providing either for the part of the vehicle to be painted or to be supported during a paint drying procedure;
(f) the adjusting means including a side bar adjusting means, a top brace bar adjusting means, and a middle brace bar adjusting means;
(g) the side bar adjusting means including a first side nesting member and a second side nesting member to form at least one side bar;
(h) the top brace bar adjusting means including a first top nesting member and a second top nesting member to form top brace bar;
(i) the middle brace bar adjusting means including a first middle nesting member and a second middle nesting member to form a middle brace bar;
(j) the at least one side bar including a first side bar and a second side bar;
(k) the top brace bar, the middle brace bar, the first side bar and the second side bar cooperating to form the frame;
(l) the first side bar and the second side bar being secured to the wheel assembly at one end thereof;
(m) the first side bar and the second side bar being secured respectively to each end of the top brace bar at an opposing end thereof; and
(n) the middle brace bar being secured to the first side bar and the second side bar at end thereof and between the wheel assembly and the top brace bar.

13. The adjustable paint rack of claim 12 further comprising:
(a) the first side nesting member receiving the second side nesting member to form at least one side bar;
(b) the first top nesting member receiving the second top nesting member;
(c) the first middle nesting member receiving the second middle nesting member;
(d) the first side nesting member including a pair of first coaxial side apertures;
(e) the first top nesting member including a pair of first coaxial top apertures;
(f) the first middle nesting member including a pair of first coaxial middle apertures;
(g) the second side nesting member including at least one pair of second coaxial side apertures;
(h) the second top nesting member including at least one pair of second coaxial top apertures; and
(i) the second middle nesting member including at least one pair of second coaxial middle apertures.

14. The adjustable paint rack of claim 13 further comprising:
(a) the at least one pair of second coaxial side apertures being at least two pair of second coaxial side apertures;
(b) the at least one pair of second coaxial top apertures being at least two pair of second coaxial top apertures;
(c) the at least one pair of coaxial middle apertures being at least two pair of second coaxial middle apertures; and
(d) the at least two pair of second coaxial side apertures, the at least two pair of second coaxial top apertures, and the at least two pair of second coaxial middle apertures providing adjustability for the rack.

15. The adjustable paint rack of claim 14 further comprising:
(a) the at least one pair of second coaxial side apertures being at least two pair of second coaxial side apertures;
(b) the at least one pair of second coaxial top apertures being at least two pair of second coaxial top apertures;
(c) the at least one pair of coaxial middle apertures being at least two pair of second coaxial middle apertures; and
(d) the at least two pair of second coaxial side apertures, the at least two pair of second coaxial top apertures, and the at least two pair of second coaxial middle apertures providing adjustability for the rack.

16. The adjustable paint rack of claim 15 further comprising:
(a) the first coaxial side apertures being alignable with the at least one pair of second coaxial side apertures to a receive a first fastening means therethrough;
(b) the first top side apertures being alignable with the at least one pair of second top side apertures to a receive a second fastening means therethrough; and
(c) the first middle side apertures being alignable with the at least one pair of second middle side apertures to a receive a third fastening means therethrough.

17. The adjustable paint rack of claim 16 further comprising the first fastening means, the second fastening means, and the third fastening means being at least one fastening means selected from the group consisting of a nut and bolt assembly, and cotter pin assembly.

18. The adjustable paint rack of claim 17 further comprising the use position for the wheel assembly comprising the wheel assembly being perpendicular to a plane of the frame.

19. The adjustable paint rack of claim 17 further comprising the storage position for the wheel assembly comprising the wheel assembly being substantially coplanar with a plane of the frame.

* * * * *